United States Patent [19]
Booth

[11] 3,985,314
[45] Oct. 12, 1976

[54] MULTIPLE LOCKING RETRACTOR

[75] Inventor: Frederick C. Booth, Birmingham, Mich.

[73] Assignee: Allied Chemical Corporation, Morris Township, N.J.

[22] Filed: June 28, 1974

[21] Appl. No.: 485,392

Related U.S. Application Data

[63] Continuation of Ser. No. 276,867, July 31, 1972, abandoned.

[52] U.S. Cl. .......................................... 242/107.4 A
[51] Int. Cl.² ...................................... A62B 35/02
[58] Field of Search ........... 242/107.4, 107 SB, 107, 242/107.4 R, 107.4 A, 107.4 B, 107.4 C, 107.4 D; 280/150 SB; 297/386, 388; 74/575, 577, 578

[56] References Cited

UNITED STATES PATENTS

| | | | |
|---|---|---|---|
| 1,075,311 | 10/1913 | Beck | 74/577 |
| 2,923,492 | 2/1960 | Walpole et al. | 242/107.4 |
| 3,332,720 | 7/1967 | Hansen | 242/107.4 |
| 3,741,496 | 6/1973 | Beller | 242/107.4 |
| 3,787,002 | 1/1974 | Hayashi et al. | 242/107.4 |

Primary Examiner—George F. Mautz
Attorney, Agent, or Firm—Clayton F. Smith; Jonathan Plaut; John P. Kirby, Jr.

[57] ABSTRACT

A reel type retractor for a safety belt having at least two locking pawls, staggered in relation to ratchet teeth incorporated into the reel and arranged for independent engagement therewith.

9 Claims, 6 Drawing Figures

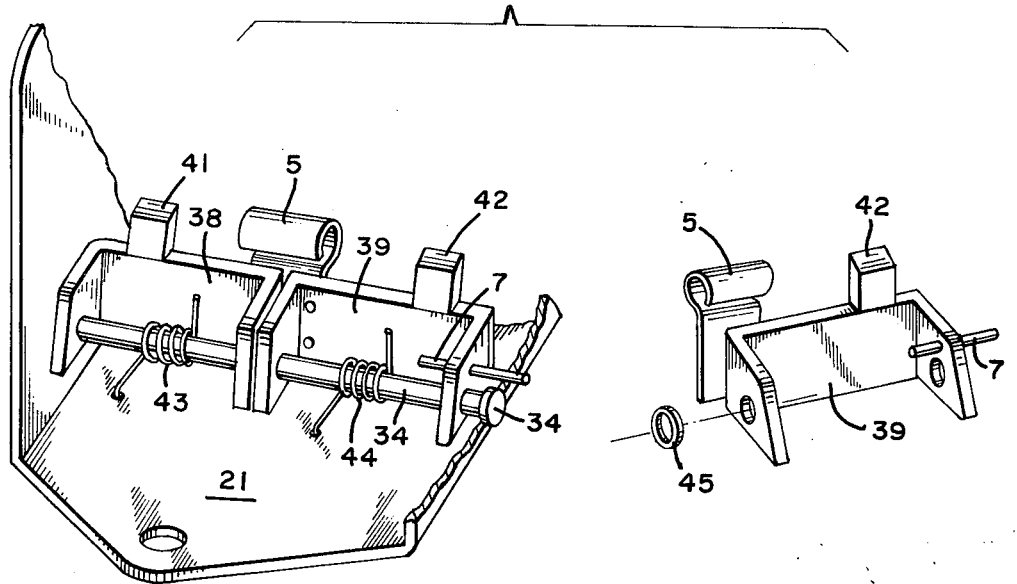
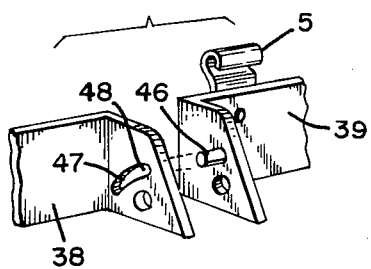
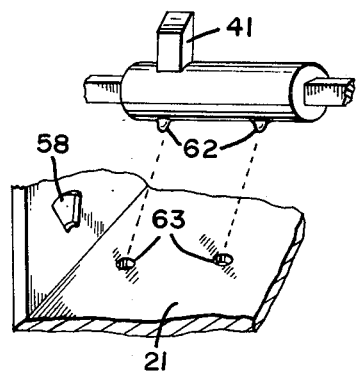
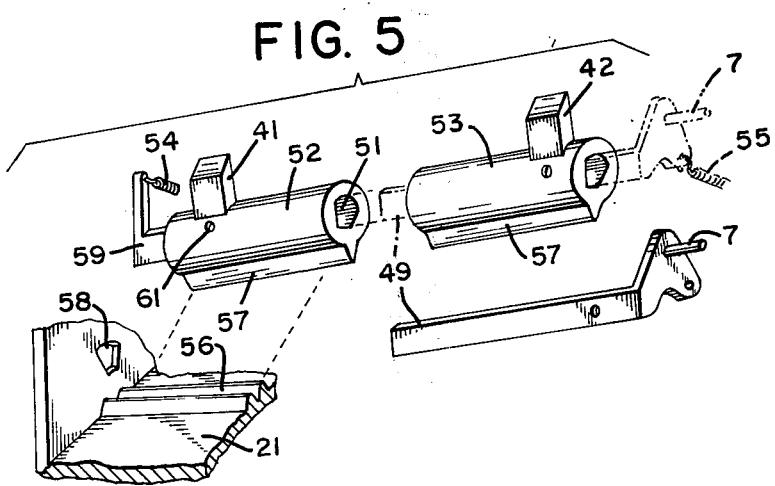

MULTIPLE LOCKING RETRACTOR

CROSS-REFERENCE TO RELATED APPLICATION

This is a continuation of application Ser. No. 276,867, filed July 31, 1972 now abandoned.

United States patent application "Safety Seat Belt Retractor", U.S. Ser. No. 162,073, filed July 13, 1971, now U.S. Patent No. 3,741,496.

BACKGROUND OF THE INVENTION

1. Field of the Invention

This invention relates to vehicle safety belt retractors, and more particularly to reel type retractors having ratchet teeth incorporated into the reel, said retractors being of the type which may retract the belt webbing and permit or prevent its extension depending on the posture of a movable pawl bar.

2. Description of the Prior Art

The advantage of retracting means for vehicle safety belts whereby belts are withdrawn when not in use, are well known. Some are of a linear design while others comprise a rotating reel, journaled in the sidewalls of a supporting structure, and biased by means of a coiled spring for winding the belt on the reel. Teeth are generally incorporated on the perimeter of one or two flanges of the reel for locking engagement wih a movable pawl bar when the reel is rotated to extend the belt. Various means have been suggested for moving the pawl bar into locking engagement with the reel when the belt is needed for safely restraining the wearer, and moving the pawl bar out of engagement, to permit withdrawing and buckling of the belt, or to permit the wearer to move about with a minimum of restraint, when such restraint is unnecessary With such retractors, it occasionally happens that when the pawl bar is moved toward locking engagement, it falls on the tip of the ratchet tooth, or the tips of a pair ratchet teeth, and therefore slips by to engage the next tooth or pair of teeth. It would be desirable to minimize this additional extension of the belt after the pawl bar has been triggered into locking position, so as to provide more positive restraint and protection. This could be achieved by increasing the number of teeth on the ratchet, but to do so would weaken the teeth and reduce the security of the lock obtained.

SUMMARY OF THE INVENTION

I have now found that by using at least two locking pawls, staggered in relation to the ratchet teeth, and arranged for independent engagement wih the teeth, the amount of continued rotation of the reel after triggering the pawls and therefore the amount of unwanted extension of the safety belt under emergency conditions, will be very considerably reduced. Alternately, I can reduce the number of teeth on a reel, thus enlarging and strengthening them, while equaling the performance of conventional retractors with respect to rapidity of response and effectiveness.

In one embodiment of my invention, I have at least two pawl bars, placed for effective operation at different points about the perimeter of the ratchet, and staggered in relation to the ratchet teeth so that when at least one is in a fully locked position, at least one has not yet reached this fully locked position. This arrangement is applicable whether there is one circular ratchet or two. Both pawl bars may be triggered, preferably by the same release mechanism but are arranged for independent locking engagement. There are many different ways in which the pawl bars may be triggered or released.

In a second embodiment, two pawl bars are longitudinally adjacent and each bar, carrying one pawl, rocks in and out of engagement with one of two ratchets along an axis which is parallel to the axis of the reel. The pawls attached to the pawl bars may be staggered in relation to the ratchet teeth by the expedient of having one pawl shorter than the other by an amount less than the length of a single ratchet tooth - preferably about half the length of a tooth. The pawl bars may be withdrawn from their locking positon simultaneously, and then may be triggered, preferably by the same mechanism, but they engage their respective ratchet independently.

In still another variation of this embodiment, the pawls may be of substantially equal length, and staggering of the ratchet teeth with respect to the pawls is achieved by positioning the two ratchets on the reel out of phase, preferably by the amount of an angle subtended by about half a tooth. In other words, a plane passing through the axis of the reel and the tip of a tooth in one circular ratchet, would bisect a tooth in the other circular ratchet.

A better understanding of these mechanisms, the relationships involved, various modifications, and the method of their operation may be had from an examination of the accompanying drawings and the description thereof to follow.

DESCRIPTION OF THE DRAWINGS

The description refers to the accompanying drawings in which like reference characters refer to like parts throughout the several views.

Figure 1:
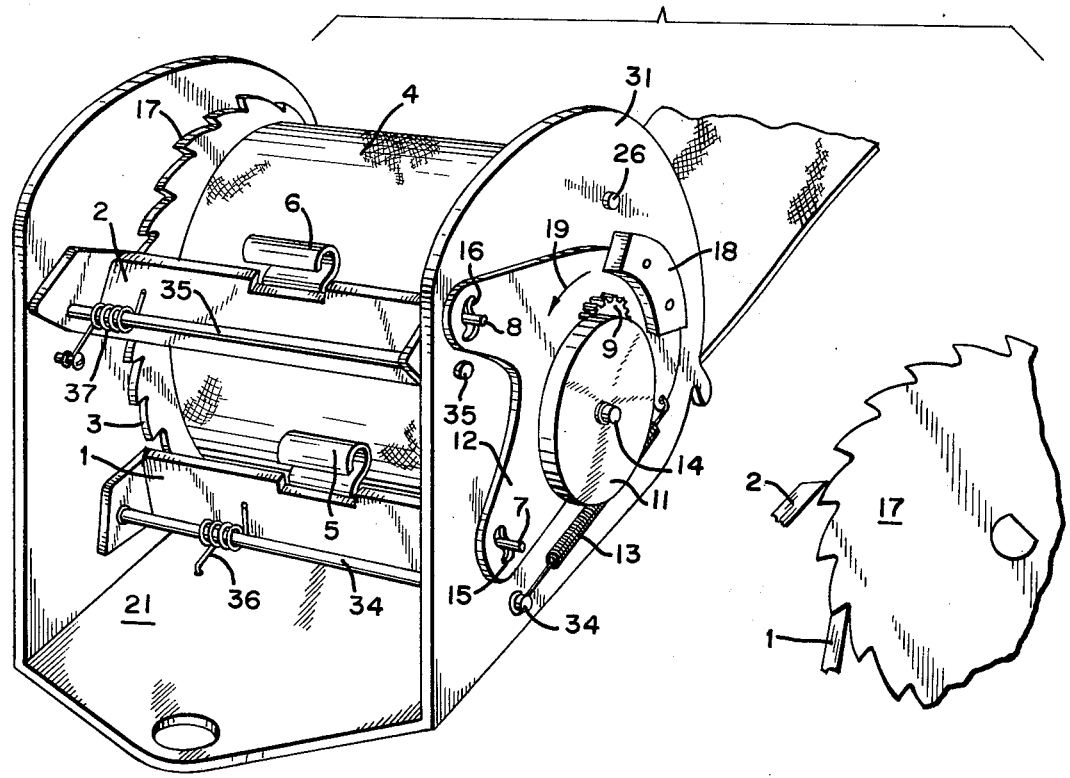
FIG. 1 is a perspective view of a safety seat belt retractor illustrating a preferred embodiment of the invention. The belt is shown wound on the reel. A cover or housing for the retractor including an opening to guide the belt onto the reel is not shown. Also included in the figure is a partial plan view of a ratchet wheel with two pawls in position to engage the ratchet but with only one pawl in locking engagement, as a consequence of the pawls being spaced out of phase with the ratchet. The same situation is illustrated in the perspective drawing, the partial plan view being included to emphasize the point.

Although my invention may be applied to substantially any type of safety belt retractor, it applies particularly to those in which a belt is wound on a reel rotatably mounted between two sidewalls, said reel having at least one circular ratchet to engage a pawl bar which may rotate or rock from a first position of engagement with the ratchet to a second position out of engagement with the ratchet. The preferred embodiment of FIG. 1 is shown incorporated into a retractor of the type which locks when a force is suddenly applied to the belt in a direction to extend it. More specifically, it is shown incorporated into a retractor of the type disclosed in U.S. Pat. No. 3,741,496, in which a driving member rotating in accordance with the reel cooperates with a driven inertial member to actuate a locking device.

Since the operation of the above retractor is detailed in the above related application it will not be repeated here except to the extent that its construction is modified to accommodate the application of the present invention.

Figure 2:
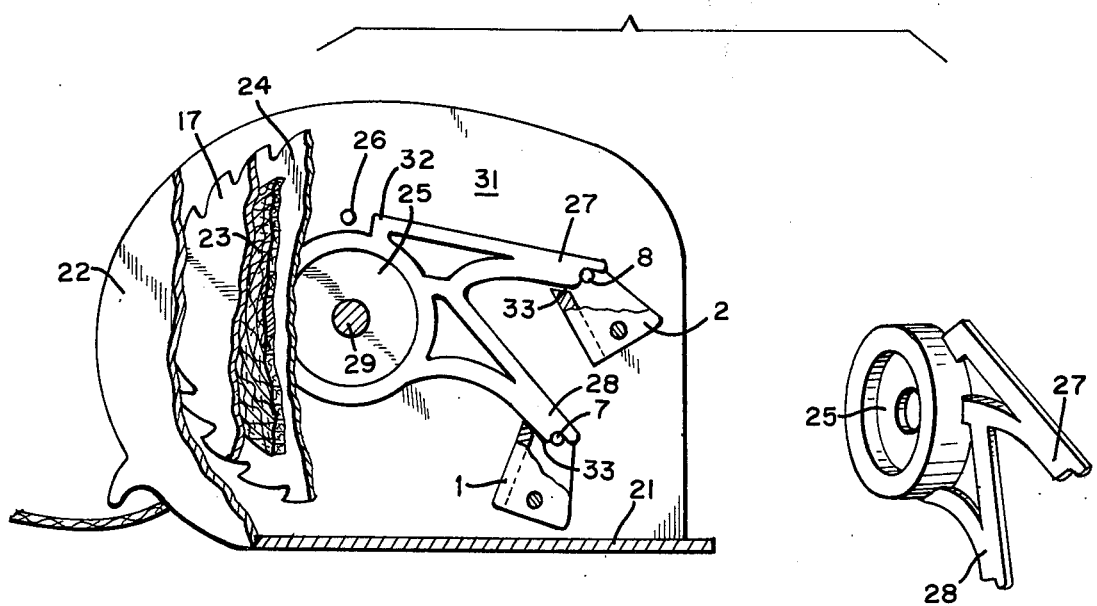

FIG. 2 is a break-away view in elevation of a preferred embodiment of the instant invention as applied to the retractor of the above cited application. The drawing illustrates the modification of the clutch which has two extending members rather than one, to hold two cam followers and therefore the pawls to which they are attached when the belt is first withdrawn from the reel for buckling. The similarity of this clutch to that of the cited application having a single extending member may be noted. Also included in this figure is an isolated perspective view of the clutch disc with its extending members.

FIG. 3 is a partial break-away perspective view of another embodiment of my invention showing two spring biased pawl bars rotatably arranged on a single spindle. The same figure also includes an isolated perspective view of the cam-controlled paw bar.

FIG. 4 is a partial perspective view of another modification of the adjacent portions of the two pawl bars of FIG. 3.

FIG. 5 is still another variation of two companion pawl bars. In this modification they are not rotatably mounted on a common spindle, but swivel in and out of engagement with the ratchet on a knife edge. Although in this variation the knife edge is integrated with the pawl bar and extends downwardly therefrom to cooperate with a groove in or attached to the sole plate of the retractor support, this knife edge could as well extend upwardly from the sole plate to engage a groove in the lower portion of the pawl bar. Included in this figure is a drawing of the strip carrying the cam follower, shown removed from the pawl structure to permit easy assembly of the pawl bar within the retractor. Also included is a partial perspective view of a portion of the retractor including a grooved support attached to or integrated with the sole plate for engaging the knife edge and a wedge shaped opening for the projecting end of the companion pawl bar.

FIG. 6 is a slight modification of the companion pawl bar of FIG. 5 in which, rather than a knife edge, protruding nodules project from the bottom of the pawl bar to engage corresponding openings in the sole plate of the retractor. With this arrangement, limited rotation of the pawl bar is permitted in and out of engagement with the ratchet, using the projecting nodules and corresponding openings as ball and socket joints. As with the knife edge, the nodules could as well extend upwardly from the sole plate to cooperate with indentations in the lower portion of the pawl bar. The wedge shaped opening in the sidewall serves to limit the degree of rotation.

Referring now to the preferred retractor assembly of FIG. 1, pawl bars 1 and 2 are rotatably mounted on spindles 34 and 35, respectively, and are biased by springs 36 and 37 to engage the ratchet teeth 3 of one or two circular ratchets which also serve as a flange or the flanges for reel 4 on which the safety belt is wound. When two circular ratchets are used, the teeth are paired so that a ratchet bar may engage corresponding teeth on each of the two ratchets, simultaneously. When the reel is fully wound and the belting is first withdrawn, webbing followers 5 and 6 hold their respective pawl bars out of engagement with the ratchets. They also hold the pawl bars at a sufficient distance from the ratchets so that the extending members or arms of the clutch disc (illustrated and explained in the next figure) drop down and hold the cam followers and therefore, the pawls to which they are attached out of engagement with the ratchets. Once the roll of webbing has diminished substantially, the webbing followers are obviously no longer effective, and the holding operation is taken over by the extending arms of the clutch disc.

As soon as the reel is permitted to rewind even a very slight amount, the reel flange to which the clutch disc is pressed by means of a clutch spring (see U.S. Pat. No. 3,741,496 carries the clutch disc with it, thus lifting the extending members away from the cam followers 7 and 8. Neither the extending arms of the clutch disc nor the webbing followers now restrain the pawls, but they still do not engage the ratchets because they are finally restrained by the irregular inside cams 15 and 16 which have now taken over the holding operation. If, however, the individual wearing the belt suddenly lurches forward, as he would do inadvertently should the vehicle become involved in a collision, the sudden extension of the seat belt imparts a momentary high rate of acceleration to both the belt reel and the spur gear 9 which is attached thereto. The torque applied to a pinion gear attached to rotating inertial member 11 (see exploded view, U.S. Pat. No. 3,741,496 imparts a force on the rotatable cam plate 12 in opposition to biasing spring 13. Cam plate 12 pivots about and is balanced about the axis of the reel and of spur gear 9, in consequence of counterweight 18. Rotating inertial member 11 with its pinion gear is rotatable on spindle 14 which is attached to cam plate 12. It is the resistance to rotation produced by the inertia of rotatable member 11 that produces a force on the cam plate. This occurs only at high rates of acceleration. At low rates of acceleration, the force produced is inconsequential and insufficient to overcome the bias of spring 13.

As the force produced as a result of a high rate of acceleration is applied to the cam plate 12, said plate is induced to rotate in the direction of arrow 19 to a degree limited by the irregular cams 15 and 16 acting against cam followers 7 and 8 respectively. the cam plate 12 thereupon allows the biased cam followers to ride to the end of their respective cams, thereby allowing the biased pawl bars to move to a position for engagement with the ratchet 17.

The pawl bars (of which only two are shown in the drawing) are positioned out of phase with respect to the ratchet teeth, as can be clearly seen in both the perspective drawing and the companion plan view of the same figure. As a result, either one or the other pawl engages the ratchet, depending on which one meets a projecting tooth first. The reel therefore need rotate through an angle less than that subtended by the length of a single tooth. Furthermore, should one pawl bar fall on the tip of a tooth and therefore fail to engage that tooth, the "back-up" pawl bar can engage a tooth before the ratchet has rotated through an angle corresponding to more than half a tooth.

FIG. 2 is a break-away view of the retractor in elevation, as seen from the side carrying the retracting spring. Sidewall 22 is broken away to expose circular ratchet flange 17 which is broken away to expose the coiled webbing 23 of the safety belt, which is in turn broken away to expose flange 24 which finally is broken away to expose clutch disc 25 on the far side of said flange 24. Clutch disc 25 is pressed against flange 24 by a spring, not shown, which encircles shaft 29, and is positioned between clutch disc 25 and sidewall 31 to thereby bias said clutch disc 25 against the contiguous face of circular ratchet flange 24. With this arrangement, the clutch spring, the clutch disc 25 and the cooperating surface of flange 24 constitute the clutch assembly, rotatable about shaft 29. When flange 24 rotates counter clockwise, as viewed in FIG. 2, as when belting is retracted, it rotates clutch disc 25 as well, since it is in frictional engagement therewith. When shoulder 32 of the clutch disc strikes pin 26, however, further rotation of the clutch disc is stopped, and the frictional clutch faces slip in relation to each other. The rotary motion, however, is sufficient to allow arms 27 and 28 which extend from the clutch disc, to lift away from cam followers 8 and 7, respectively. The holding operation is then taken over by the irregular inside cams 16 and 15 on the far side of sidewall 31, which can be seen in FIG. 1.

When the safety belt is withdrawn from the retractor, flange 24 rotates clockwise as viewed in FIG. 2 and carries with it clutch disc 25. If the belt is being withdrawn from a substantially full reel, webbing followers 5 and 6 (FIG. 1) hold the pawl bars at a sufficient distance from the ratchets, so that the contoured tips of extending clutch disc arms 27 and 28 will rotate clockwise until they engage cam followers 8 and 7, as shown in FIG. 2. They will continue to hold the cam followers and consequently the pawl bars to which they are attached, out of engagement with the ratchets, for as long as the belt is continuously withdrawn, thus permitting the user to withdraw the belt for buckling without hinderance. If this holding operation is interrupted and there is even a slight degree of rotation of the reel in the rewind direction, which generally occurs during the actual buckling operation, the arms 27 and 28 are lifted away from the cam followers. since the webbing followers no longer touch the webbing in consequence of the reduced diameter of the roll of webbing on the reel, the cams, although still keeping the pawls out of engagement with the ratchets, permit some degree of motion in their direction. If now the webbing is slowly withdrawn further as can occur as the buckled individual moves about, the arms 27 and 28 will again rotate in a clockwise direction as viewed in FIG. 2, but the cam followers will have moved sufficiently in a direction toward the reel, so that the contoured end of said arms will not catch and trap the cam followers, but rather the followers will act as stops for the further rotation of the cams and will come in contact with them at a point on their lower edge, as at points 33. In this position, the arms offer no restraint to the cam followers when finally released by the irregular cams. The cam followers slip unhindered along the undersurface of the extending arms, as the pawl bars to which the cam followers are attached are biased into position to engage the ratchets.

FIG. 3 is a partial break-away drawing of a retractor similar to FIG. 1 which represents another embodiment. Two modified pawl bars are used as before, but both rotate on a single spindle 34 and operate in conjunction with two circular ratchet flanges, pawl 41 engaging one and pawl 42, the other. Each has its own spring, pawl bar 38 being biased by spring 43, and pawl bar 39 by spring 44. As with the retractor of FIG. 1, pawl bar 39 is controlled through cam follower 7. Pawl bar 38 is also controlled through cam follower 7, but indirectly, in the following manner. Webbing follower 5 is attached to pawl bar 39 but not to pawl bar 38; however, it overlaps pawl bar 38 so that when pawl bar 39 is held against the bias of spring 44 by the holding action of the webbing follower 5, or the extended arms of the clutch disc (FIG. 2) or the contour of the irregular cam 15 (FIG. 1), said pawl bar 39 restrains pawl bar 38 by virtue of the overlapping webbing follower 5. This arangement can more easily be seen by reference to the isolated pawl bar of the same figure. Note also that this includes a washer 45, preferably of nylon or Teflon, which separates the pawl bars on the shaft to improve their action and minimize possible interference one with the other. Preferably, similar washers are also placed on the spindle between the pawl bars and the adjacent sidewalls.

Pawl 41 leans forward from its pawl bar so that when pawl bars 38 and 39 are held out of engagement, pawl 41 extends further in the direction of the ratchets than pawl 42 by an amount substantially equal to the effective height of one ratchet tooth. That is to say, if the two pawl bars were to retain the same relationship, one with the other, which they do in their out-of-engagement position and yet if they were moved while retaining this relationship to the engaged position, at the point where pawl 41 was fully engaged with a ratchet tooth, pawl 42 would be just out of engagement. It would lie substantially on the perimeter of a circle touching the tips of all the teeth in the circular ratchet. It can be seen, therefore, that pawl 41 receives the first opportunity to engage a circular ratchet, but it can also be seen that whereas pawl bar 29 can control pawl bar 38 by virtue of the overlapping webbing follower, the reverse is not true. Pawl bar 42 can rotate and is biased to rotate as far as necessary for full engagement with its ratchet. Obviously, the same relationship between the pawls can be achieved in many different ways as by shaping the pawl bar, by recessing it, by shaping the webbing follower to allow more tilt to pawl bar 38 than is permitted pawl bar 39, etc.

In actual performance the time lapse between the latching of pawl 41 and pawl 42 would be extremely small and if the teeth were paired, in most instances each pawl would engage one of the two teeth in a pair; a pair being two teeth in a plane which would also include the axis of the reel. It is possible, of course, that pawl 41 might just slip under the tip of a tooth to latch, leaving pawl 42 resting on top of the corresponding tooth in the opposite ratchet, but, of course, only one latched pawl and ratchet are necessary. Many retractors are designed to rely on only one ratchet.

But an important benefit of my invention is that the reel may be latched before it has turned through an angle subtended by a single tooth, or if a pawl lands on the tip of a tooth and fails to latch, that latching is accomplished thereafter when the ratchet has rotated through an angle subtended by about one-half of one tooth. This benefit may be accomplished in two ways. First, the two ratchet wheels are positioned on the reel, "out of phase", that is, a plane including the axis of the reel and the beginning of one tooth substantially bisects a tooth on the other side of the reel. It then follows that either one or the other pawl engages a ratchet, generally before the reel has rotated through an angle subtended by half a tooth or less, after the time either pawl first touches a ratchet.

The second way in which the same effect may be obtained is to keep the ratchets paired and shorten or lengthen one pawl with respect to the other, so that when one pawl first touches a tooth at one end, the other touches its corresponding tooth substantially at its center.

In either the first or second method, if desired, the ratchets can be positioned, or the length of the pawls adjusted, to compensate at a selected rate of rotation, for the slight difference in lapsed time between the action of the two pawls (based on the fact that one pawl tilts further toward the ratchet then the other).

Ther are many different ways in which this type of dual, independently acting pawls can be designed so that the controlled pawl bar 39 releases the companion pawl bar for action. In FIG. 3 this was accomplished by means of an overlapping webbing follower; particularly advantageous since the webbing follower is generally present, and may as well serve a dual role.

In FIG. 4, another way in which the same action may be accomplished is shown. Here the webbing follower is placed on the controlled pawl where it is quite as effective as if centered. By "controlled pawl", we mean the pawl which is controlled by the action of a cam and cam follower, clutch, webbing follower, or other means, directly related to the operation of the retractor.

In this modification of FIG. 4, extending pin 46 is slideably positioned in arcuate slot 47. When both pawl bars are in their out-of-engagement position, pin 46 is seated at point 48 in slot 47, and therefore when pawl bar 39 is rocked back, out-of-engagement, pin 46 acting at point 48 in the slot, brings pawl bar 38 back with it. On the other hand, when both bars are urged forward by their independently operating biasing springs, pawl bar 39 is free to move forward, limited only by the length of arcuate slot 47, regardless of whether pawl bar 38 is restrained or not. Should the pawl connected to pawl bar 38 strike the tip of a tooth, pawl bar 39 remains free to latch with its corresponding ratchet. Any extension of pawl bar 39, which will draw pawl bar 38 back with it into the unlatched position, yet allow itself freedom to move forward into latching position irrespective of the action of pawl bar 38, would be satisfactory. There are many different ways in which this may be accomplished.

One other benefit of the pawl bars depicted in FIGS. 3 and 4 (as well as FIGS. 5 and 6 to follow) is that when they are in latched position, they may rest on, or be made contiguous with the sole plate 21 so that no matter how great the force applied against them by the ratchet, they need not depend on the spindle for strength. In their latched position they may be braced between the ratchet teeth and the floor or sole plate 21 of the retractor.

FIG. 5 illustrates another variation of the dual latch bar which may also be adapted to the retractor of FIG. 1, or to other variations where the clutch assembly, if incorporated into the retractor is positioned outside of the two supporting walls rather than between them. Here, a thickened latch bar is used, shown as cylindrical, in which strip 49 acting in wedge-shaped recess 51 serves to rotate latch bar 52 out-of-engagement with the ratchet. It can be seen that as latch bar 53 rotates out-of-engagement, strip 49 acting on the flat face 51 of the recess, will carry latch bar 52 back with it, against the bias of spring 54. When latch bar 53 is released through its cam follower 7 (or other releasing means) for engagement with the ratchet, it can rotate forward by virtue of the wedge shaped recess even if pawl bar 52 should be restrained, as for example, by latch 41 initially striking the tip of a ratchet tooth. Spring 55 serves as the bias for latch bar 53. Also included in FIG. 5 is groove 56 which may be fastened or integrated into the sole plate as shown in the partial section of the sole plate and one supporting wall. This groove serves to support the knife edges 57 of the pawl bars. Although not essential, some such support is recommended since no spindle is here used. The groove adds great strength to the pawl bar assembly. If desired, the design can be reversed with the knife edge extending upwardly from the sole plate to cooperate with a groove in the bottom of the pawl bars.

Wedge shaped aperture 58 (FIGS. 5 and 6) is provided for extending arm 59 beyond the sidewall. For convenience, in assemblying the pawl bars, pawl bar 52 may be placed in groove 56 adjacent to aperture 58. Biased member 59 can be inserted from outside the sidewall, through aperture 58 and into a corresponding recess in pawl bar 52. Set screw 61 may then be screwed into place, preferably going through a corresponding hole in biased member 59. Next, pawl bar 57 is placed in groove 56, preferably with a thin nylon or Teflon washer between the two pawl bars. Strip 49 is now inserted through a wedge shaped opening in the sidewall, similar to that shown as 58 in the opposite sidewall. It is then pushed through a corresponding snug longitudinal opening in pawl bar 53 until it extends sufficiently to properly engage recess 51 in pawl bar 52, and to properly position cam follower 7. Here again, a set screw may be used, preferably passing into or through a corresponding opening in strip 49. The pawl bar assembly is now complete, with the bar free to rock in and out of engagement using knife edge 57 and groove 56 as a fulcrum.

Finally, FIG. 6 represents a variation of the pawl bar 52 of FIG. 5. Rather than a knife edge, rounded or pointed nodules 62 extend into sockets or corresponding holes or depressions 63 in the sole plate 21, so that the nodules and corresponding holes or depressions function as ball and socket joints, permitting the pawl bars to rotate into and out-of-engagement with the ratchets. of course, the nodules can be used in conjunction with a groove such as 56 of FIG. 5, or the nodules can extend upward from the sole plate to engage corresponding depressions in the bottom of the pawl bar. In either case, a multiplicity of nodules may be used, or only one for each pawl bar. As previously mentioned, such an arrangement as that of FIGS. 5 and 6 as well as FIGS. 3 and 4 offers the advantage of great strength, since all force applied to the pawls is conducted directly to the floor or sole plate of the retractor.

DESCRIPTION OF THE PREFERRED EMBODIMENT

A preferred embodiment of my invention is a seat belt retractor comprising a support having a base or sole plate and two parallel walls extending therefrom and having a reel adapted for connection with a seat belt journaled in the support for axial rotation in a wind direction and in an opposite unwind direction. The reel has at least one and preferably two circular flanges with ratchet teeth in their periphery, and at least two, and preferably two pawl bars, each arranged and biased for independent locking engagement with the reel in the unwind direction. The pawl bars are positioned out-of-phase with respect to the ratchet teeth, whereby when the pawl bars are triggered for engagement with the ratchet teeth, and preferably one pawl bar is in full locking engagement therewith, the other pawl bar is not in full locking engagement therewith.

In the preferred embodiment, the teeth of the ratchets are paired and when one pawl bar latches wth a tooth on one ratchet, it simultaneously engages the corresponding tooth in the opposite ratchet. The two pawl bars, however, are so positioned, as previously indicated, so that when one pawl bar is in latching engagement with the ratchets, the second pawl bar has not reached latching engagement.

In an alternate arrangement the teeth of the two ratchets on the reel are staggered in relation to each other, and one pawl bar is provided wih only one pawl positioned on the left side, and the other pawl bar with only one on the right. With this arrangement, it is preferable to have both pawl bars positioned in phase with the ratchet teeth of one ratchet, so they will be out-of-phase with respect to the two.

Returning to the preferred embodiment, webbing followers attached to the two pawl bars act on the roll of webbing when the belt is first withdrawn for buckling, to restrain them from engaging the ratchets. Various means may be used for restraining the pawl bars after the diameter of the roll of webbing has been reduced, as a result of the extension of the belt, to a point where the webbing followers no longer serve to restrain them.

Our use of the term "pawl bar" is intended to include the pawls, which may be that portion of the pawl bar which actually contacts the ratchet teeth, or members extending from the pawl bars for such contact.

In the preferred embodiment, the restraint of the pawls, which is first accomplished by the webbing followers, is next taken over by members or arms extending from a clutch disc which is biased against a flange by a clutch spring. As the reel rotates in an unwind direction the clutch disc rotates with the flange, bringing the extending arms with contoured tips into position to restrain both pawl bars out of engagement with the ratchets (when the belt is first withdrawn and the webbing followers are effective because of the substantially full roll of webbing). Since both arms extend from one clutch disc, we refer to a "common means" of restraining the pawl bars. In this embodiment, when the roll of webbing has been reduced to a point where the webbing followers are no longer effective, and the reel is rotated even momentarily in the rewind direction (which almost invariably happens during the act of buckling), the clutch disc rotates with the reel flange to lift the arms out of their restraining position with respect to the pawl bars.

If now the belt is extended further, the arms again rotate to contact the pawl bars, but since they are no longer held by the webbing followers, the contoured ends of the arms over-extend and cannot reach a position wherein they can further restrain the pawl bars. The restraining action of each arm is actually applied to its respective pawl bar as a result of the arm contacting an extension of a cam follower which is attached to the pawl bar, thus when the arm over-extends, it rests on the cam follower which can readily slip beneath it if the pawl bar is triggered into position to engage the ratchets.

The actual triggering of the pawl bars in this embodiment is accomplished by movement of two irregular cams in a single cam plate, which is biased to hold the pawl bars to which the cam followers are attached, out of engagement with the ratchets. Since both irregular cams are in one cam plate, we refer to a "common means" of triggering or releasing the pawl bars. Rotating the cam against its bias simultaneously allows each cam follower to ride to the end of its respective cam, urged by its own bias, thus "triggering" or releasing the pawl bars, of which the cam followers are a part, into locking engagement with the ratchets.

The movement of the cam may be induced in several different ways. In the preferred embodiment, it is induced by a sudden rotational acceleration of the reel in the manner disclosed in U.S. Pat. No. 3,741,496.

In another preferred embodiment, two pawl bars are longitudinally adjacent with respect to each other and rotatably positioned along a single axis parallel to the axis of the reel, so that the pawl of each of the two individual pawl bars may engage a tooth in one of the two circular flanges having ratchet teeth. Again, it should be noted that this novel locking system, and the several variations disclosed are adaptable to a great variety of different safety belt retractors. The use of this system is in no way limited to the particular type of retractor herein described.

Preferably, the ratchet teeth of the two ratchets of this particular embodiment are staggered with respect to each other so that the pawls are out-of-phase with the ratchets. Alternately, the ratchets may be paired, but one pawl may extend upwardly with respect to the other by an amount less than the length of a single ratchet tooth and preferably by an amount substantially equal to one-half the length of a single tooth so that the two pawls will be out-of-phase with respect to the ratchets, even if the ratchets are paired. By "paired" I mean that a plane containing the tip of a tooth of one ratchet and parallel to the axis of the reel, also contains the tip of a tooth in the opposite ratchet.

The two longitudinally adjacent pawls may rotate on a common shaft, in which case it is preferable to so position them that when they are fully engaged with the ratchet, at least part of the pawl bar is contiguous with the base of the support or sole plate.

With this embodiment, only one arm is needed extending from a clutch disc, and only one irregular cam is needed in the cam plate. These both act on a cam follower attached to one of the two adjacent pawl bars. When the first pawl bar is restrained by the webbing follower, the arm extending from the clutch disc, or the irregular cam; a member extending from the first pawl bar engages the second pawl bar to restrain the second when the first is restrained and release the second when the first is released, while permitting the pawl of either to fully engage its respective ratchet independent of the engagement of the other. The extending member may take several forms. It may, for example, be the webbing follower, attached to the first and overlapping the second. Alternately, it may be an extending pin which slideably engages a slot in the adjacent pawl bar, whereby as the first pawl bar is moved away from the reel, the pin acting against the end of the slot, carries the second pawl with it, and when the first pawl bar moves toward the ratchet it releases the second to move accordingly, but if the second is restrained at any point in its rotation toward the ratchet, the bias of the first causes the pin to slide along the slot, allowing the first pawl bar to rotate to a position of engagement with the ratchet. In still another variation the extending member may protrude longitudinally from the end of the pawl bar which carries the cam follower, and extend into a recess in the second pawl bar, so shaped in relation to the extending member that when the first pawl bar rotates away from the ratchet, it carries the second with it, but when the second is held at any point in its rotation toward the ratchet, the first is free to rotate into full locking engagement with the ratchet, since it is biased for rotation in that direction. In each of these variations wherein a first pawl bar is activated through a cam follower attached thereto, and a second adjacent pawl bar is activated by an extension of the first, it is desirable that the pawl attached to the second pawl bar extend closer to its ratchet than does the corresponding pawl attached to the first, when both pawl bars are in a restrained position. This extension of the pawl of the second pawl bar toward the ratchet, beyond the position of the pawl of the first which carries the cam follower, amounts to a distance substantially equal to the effective height of one tooth. In this way, the pawl of the second pawl bar is given the first opportunity to engage its ratchet and most generally it is the first to do so. In the event that it should strike the tip of a tooth, however, and not immediately engage, the pawl of the first pawl bar is free to engage. It can be seen that if the pawl of the second pawl bar were not extended in relation to the first, and the pawl of the first pawl bar struck the tip of a tooth and failed to immediately engage, it might also hold the pawl of the second pawl bar out of engagement with the ratchet.

The two longitudinally adjacent pawls of this variation are preferably in contact with the base of the support or sole plate, along a line parallel to the axis of the reel, and they rotate about this line in their rotation in and out of engagement with the ratchets. This line may consist of a groove-and-knife-edge contact, with the knife edge either extending downwardly from the pawl bars to a groove in the sole plate, or upwardly from the sole plate to grooves in the pawl bars. Alternately, the line may include points or nodules extending downwardly from the pawl bars or upwardly from the sole plate along this line of pivoting, to engage corresponding openings for cooperation therewith as ball and socket joints. In these variations of the longitudinally adjacent pawl bars where an extending member protrudes longitudinally from the end of the pawl bar carrying the cam follower, this extending member may be the end of a portion of a strip which extends longitudinally through a corresponding channel or tunnel in the latch bar, and carries at its other end a cam follower and, if desired, a point for attaching biasing means. This arrangement simplifies assembly, since the two adjacent pawl bars can be placed within the support preferably with a thin washer, preferably a nylon or Teflon washer between them, and the strip can be inserted into the pawl bar through an opening in the support wall, until it extends all the way through to provide the "extending members". In this position it can be secured by pinning or by means of a set screw which preferably passes into or through an opening in the strip. Similarly, a strip may be inserted part way into the end of the adjacent pawl bar, through an opening in the support wall, then secured. If desired this strip can also be used for the attachment of the biasing means for this pawl bar.

The invention has been herein described in an illustrative manner. It is to be understood that the terminology which has been used is intended to be in the nature of words of description rather than of limitation.

I claim:

1. In a safety belt retractor, the combination comprising:

a. support having two parallel walls;
   b. a reel adapted for connection with a seat belt, journaled in the support for axial rotation in a wind direction and in the opposite unwind direction, said reel having at least one circular flange with ratchet teeth in its periphery;
   c. at least two pawl bars, each arranged for independent locking engagement with the reel in the unwind direction, each pawl bar having an elongated member, said elongated member having a longitudinal axis disposed substantially parallel to said reel, said elongated member having a length approaching the distance between said parallel walls of said support, said elongated member having a locking edge extending substantially across the distance between said parallel walls for engagement with said ratchet teeth of said at least one flange located adjacent to either of said parallel walls, the pawls of said pawl bars being positioned out-of-phase with respect to the ratchet teeth, whereby when said pawls are biased in position for locking engagement with the ratchet teeth, and at least one pawl is in full locking engagement therewith, at least one pawl is not in full locking engagement therewith;
   d. means for restraining the pawls against their bias to permit withdrawal of the belt, said restraining means comprising at least two web followers, one web follower mounted on each pawl bar, at least two cam followers, one cam follower mounted on each pawl bar, and at least two clutch arms mounted on a common clutch means, one clutch arm cooperating with each cam follower; and
   e. means for triggering the pawls into position for locking engagement with the reel to prevent withdrawal of the belt, said triggering means comprising at least two cams mounted on a common cam means, one cam for each cam follower.

2. In a safety belt retractor, the combination comprising:

a. a support having a base and two parallel walls, said support being adapted for attachment to a vehicle, each of said walls having openings for the attachment of the components of the belt retractor;
   b. a reel assembly adapted for connection to a seat belt, said reel being journaled in the walls of the support for rotation in a winding direction and in the opposite unwind direction, said reel assembly having at least one circular flange with ratchet teeth in its periphery;
   c. at least two pawl bars arranged between said walls for independent locking engagement with the reel in the unwinding direction, each pawl bar having an elongated member with its longitudinal axis disposed substantially parallel to the longitudinal axis of said reel assembly and two end members disposed at opposite ends of said elongated member, said end members each having a planar surface approximately perpendicular to a planar surface of said elongated member, each of said end members disposed adjacent to and approximately parallel with one of said parallel walls of said support, said elongated member having a length approaching the distance between said parallel walls of said support, said elongated member having a locking edge extending substantially across the distance between said parallel walls for engagement with said ratchet teeth of said at least one flange located adjacent to either of said parallel walls;

d. means common to the pawl bars for restraining them against their bias to permit withdrawal of the belt for buckling and to accommodate the normal motions of a wearer, said restraining means comprising at least two web followers, one web follower mounted on each pawl bar, at least two cam followers, one cam follower mounted on each pawl bar, and at least two clutch arms mounted on a common clutch means, one clutch arm cooperating with each cam follower; and e. means common to the pawl bars for triggering them for locking engagement with the reel, said triggering means comprising at least two cams mounted on a single cam plate, one cam for each each cam follower, the pawls of said pawl bars being positioned out-of-phase with respect to the ratchet teeth, whereby, when said pawl bars are triggered for engagement with the ratchet teeth, and at least one pawl is in full locking engagement therewith, at least one pawl is not in full locking engagement therewith.

3. The safety belt retractor of claim 1 having two pawl bars.

4. The safety belt retractor of claim 1 wherein the web followers are in contact with a roll of webbing on the reel when said roll has a diameter greater than a preselected amount.

5. The safety belt retractor of claim 4 wherein the clutch arms extend from a clutch disc pressed against a reel flange, whereby, when the reel is turned in an unwind direction and the pawl bars are restrained by the web followers, the clutch arms will rotate in position to take over the restraining action when the web followers no longer provide this restraint.

6. The safety belt retractor of claim 1 wherein the cams are irregular in shape in a cam plate and act on the cam followers attached to the pawl bars to restrain the pawl bars against their bias.

7. The safety belt retractor of claim 1 wherein the means for triggering the pawls into position for locking engagement comprise two cams responsive to the rapid deceleration of the vehicle to release the cam followers attached to the biased pawl bars.

8. In a safety belt system, the combination comprising:

a. a support having parallel side walls;

b. a reel adapted for connection with a seat belt journaled in the support for rotation in a wind direction and in the opposite unwind direction, said reel having at least one circular flange with ratchet teeth in its periphery;

c. at least two pawl bars, each arranged between said side walls for independent locking engagement with the reel in the unwinding direction, each pawl bar having an elongated substantially rectangular member with its longitudinal axis disposed substantially parallel to the longitudinal axis of said reel and two end members disposed at opposite ends of said elongated member, said end members each having a planar surface approximately perpendicular to a planar surface of said elongated member, each of said end members disposed adjacent to and approximately parallel with one of said parallel side walls of said support, said elongated member having a length approaching the distance between said parallel walls of said support, said elongated member extending substantially across the distance between said parallel walls, said elongated substantially rectangular member having a locking edge thereon extending along substantially the entire length of said member for engagement with said ratchet of said at least one flange located adjacent to either of said parallel walls, the pawls of said pawl bars being positioned out-of-phase with respect to the ratchet teeth, whereby, when said pawls are biased in position for locking engagement with the ratchet teeth and at least one pawl is in full locking engagement therewith, at least one pawl is not in full locking engagement therewith;

d. a driving rotating member adapted to rotate in accordance with the rotation of the reel;

e. a driven rotating member positioned to cooperate with the driving rotating member, whereby in response to the reel being rotated in the unwind direction with an acceleration exceeding a predetermined rate, said driven rotating member will activate the pawl bars into position for locking engagement with the reel; and f. a control means for relating locking engagement of said pawl bars to the operation of said retractor, said control means comprising at least two web followers, one web follower mounted on each pawl bar, at least two cam followers, one cam follower mounted on each pawl bar, and at least two clutch arms mounted on a common clutch means, one clutch arm cooperating with each cam follower, and at least two cams mounted on a common cam means, one cam for each cam follower.

9. The safety belt retractor of claim 8 wherein said pawl bars are placed at different points about the perimeter of said circular flange.

* * * * *